United States Patent [19]
Weichart et al.

[11] 4,204,188
[45] May 20, 1980

[54] CABLE FOR SEA SEISMIC EXPLORATION

[75] Inventors: Helmut Weichart, Hanover; Jürgen Schmidt, Husum, both of Fed. Rep. of Germany

[73] Assignee: Prakla-Seismos GmbH, Fed. Rep. of Germany

[21] Appl. No.: 902,220

[22] Filed: May 2, 1978

[30] Foreign Application Priority Data

May 4, 1977 [DE] Fed. Rep. of Germany ....... 2719951

[51] Int. Cl.² .......................... G01V 1/00; H04B 13/00
[52] U.S. Cl. .....................................367/154; 174/47; 174/101.5; 339/15, 339/47R; 339/49R; 340/320
[58] Field of Search .............. 174/101.5, 47; 340/7 R, 340/320; 339/15, 47, 49, 75 R, 75 M

[56] References Cited

U.S. PATENT DOCUMENTS

| 925,293 | 6/1909 | Cheney | 339/47 R |
|---|---|---|---|
| 2,190,230 | 2/1940 | Cole | 339/75 R |
| 2,506,979 | 5/1950 | Varnum | 339/47 R |
| 3,812,455 | 5/1974 | Pearson | 339/49 R |

FOREIGN PATENT DOCUMENTS

2321785 3/1977 France .................................. 339/47 R

*Primary Examiner*—S. C. Buczinski
*Attorney, Agent, or Firm*—Roylance, Abrams, Berdo & Farley

[57] ABSTRACT

An improved seismic measuring cable includes a series of hose sections containing hydrophones or the like joined together by coupling devices having cylindrical sections carrying sleeves joined to the hoses and half-tube portions joinable to each other. Each half-tube portion has castellations which interlock with a like half-tube portion to form a tension-resisting cylindrical closed volume for containing electrical connectors to interconnect wires leading to the hydrophones, the interlocked half-tubes being then covered by a cylindrical jacket. Tension load cables extend between the coupling devices at opposite ends of a hose section. The hoses can be oil filled. Embodiments of hose supporting members, hydrophone supports and joining means are disclosed.

27 Claims, 12 Drawing Figures

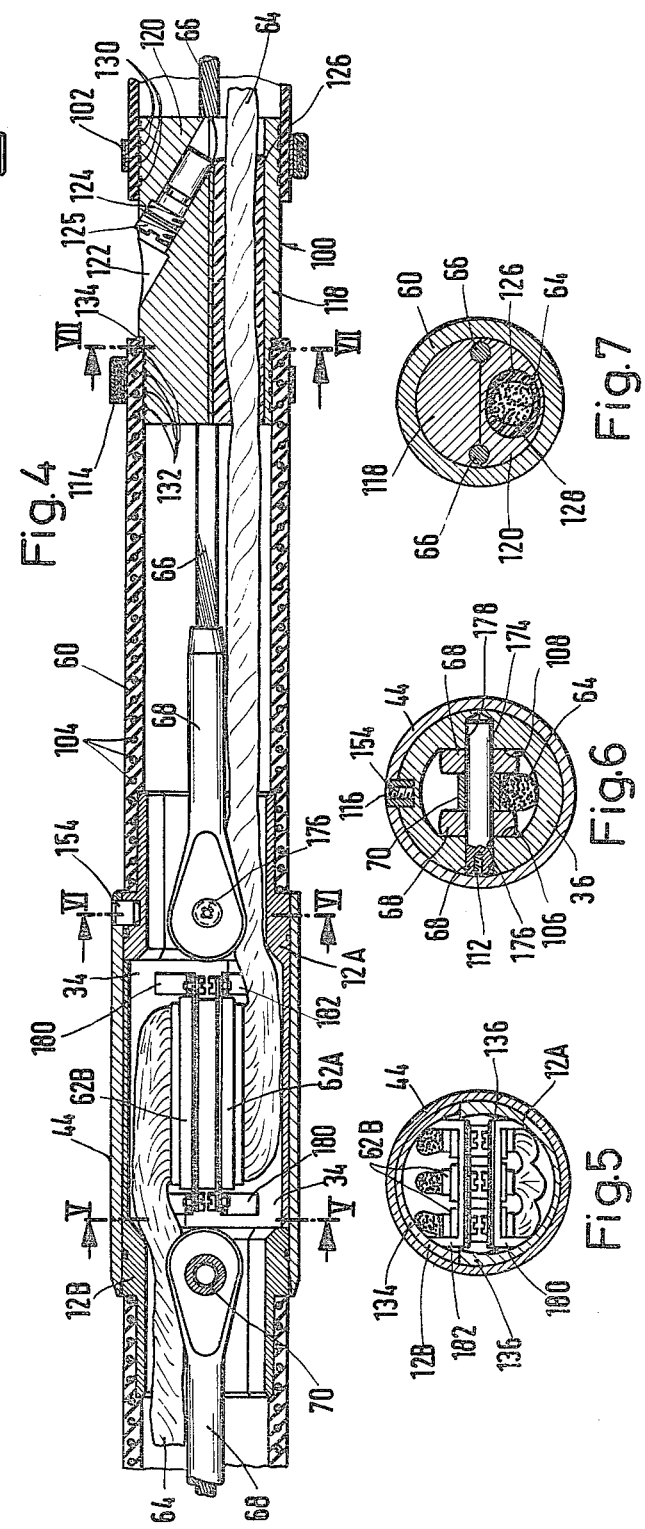

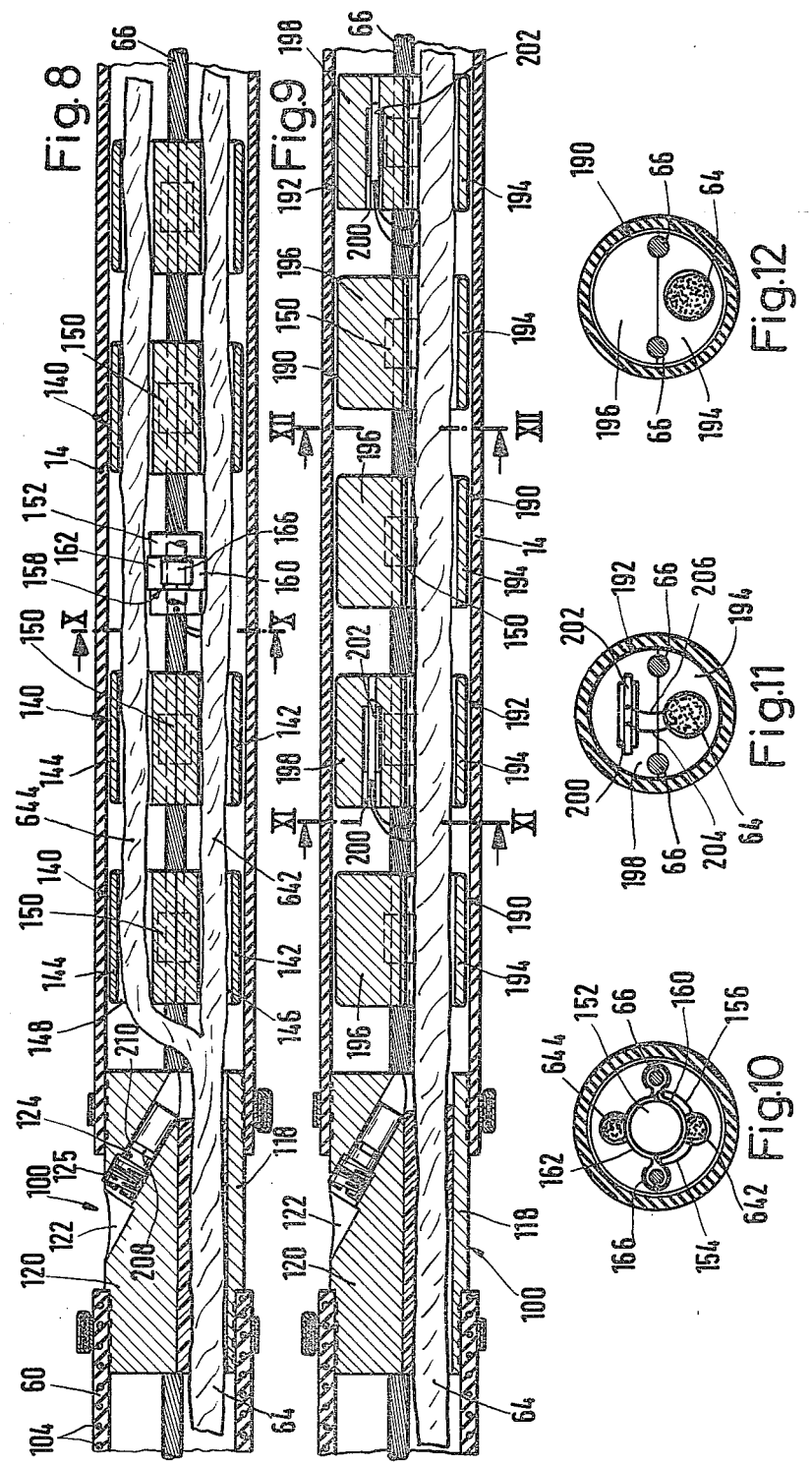

CABLE FOR SEA SEISMIC EXPLORATION

This invention relates to an improved measuring cable for making seismic measurements at sea.

BACKGROUND OF THE INVENTION

Measuring cables for making measurements at sea are commonly composed of several sections which are individually interchangeable and which are interconnected by couplings. The jackets which usually are made of a flexible, yielding plastic material and are filled with a means for providing buoyancy. Preferably, oil is used as the buoyancy providing means, but foamable materials are another example of substances well suited for providing the cable with buoyancy for certain kinds of measurement systems.

Such measuring cables, which are also called streamers, are generally used at the present time for receiving the reflected signals in sea seismic measurements. A large number of pressure-responsive microphones, also called hydrophones, are installed inside the cable and are coupled to the surrounding water through the oil and through the soft cable jacket.

Measuring cables in use at the present time normally have a maximum length of about 2,400 meters and contain 48 or 96 groups, for example, each having approximately 30 hydrophones. These cables are composed of pieces 50 and 100 meters long, as an example, so that if the cable is damaged or the functioning of a hydrophone or a group of hydrophones is disturbed, it is not necessary to replace the entire cable but only the damaged or defective section.

Recently, efforts have been made to obtain considerably more information when carrying out sea seismic measurements at as small a cost as possible. In order to accomplish this, there are two primary steps which can be taken, one being lengthening the measuring cable in order to be able to eliminate multiple reflections better in processing the data gathered, and increasing the number of hydrophone groups in order to achieve better resolution with shorter hydrophone groups at smaller intervals in measuring the upper strata.

In doing this, care must be taken that the measuring cable actually has the same outside diameter throughout its entire length in order to avoid the creation of turbulence in the surrounding water and a deterioration of the signal-to-noise ratio in the measuring process which is caused by such turbulence.

The requirement of a uniform outside diameter is, in fact, satisfied by the measuring cables customarily used at present, but it can only be adhered to in the case of comparatively large cable diameters although the efforts, since the creation of the first sea seismic measuring cables, has been to produce cables having diameters as small as possible in order to keep the cable weight and space requirements as small as possible in view of their use on measuring ships.

The chief difficulties which have prevented a further reduction in the diameter, up to the present time, arise in connection with the design of the connections or couplings between individual sections of cable. These connections must have enough tensile strength to transfer the rather large longitudinal forces existing in the cable, and also must provide a secure connection of the electrical conductors, in a way such that the connections are sealed against the penetration of water.

Since a multiplex transmission of the receiving signals has not been possible up to the present time, electrical connections are needed for signal transmission. Therefore, the principal problem consists in accommodating these connections in the couplings at the ends of the individual cable sections.

Specifically, the contact thickness in the connections cannot be made arbitrarily because these connections must have a certain amount of sturdiness for operation at sea and this is only obtainable in a certain size of the tested connections commercially available. The coupling construction of a familiar measuring cable of the type first mentioned illustrates how difficult it is to satisfy the requirements which, in part, are mutually contradictory.

In fact, this known coupling consists of like coupling halves which differ from each other only in the fact that the plug part is located in one-half and the socket part in the other half of the electrical connection.

However, each coupling half consists of a main element with a comparatively complicated shape for the lead wires to pass through and for accommodating the connections. Furthermore, three additional parts are provided which must be screwed onto the main element separately to secure a tension cable. The production and assembly of the coupling havles, which are each composed of several precision parts, takes quite a bit of time and effort.

Connecting two coupling halves to connect individual cable sections is accomplished with strong threaded bolts. These bolts run through the connecting parts diametrically and, therefore, they must receive and withstand all of the longitudinal forces transmitted through the load cables. The parts of the coupling halves intended for fastening the load cables and receiving the threaded bolts are constructed solidly. Therefore, the installation space remaining for the connections is limited and the weight of this known coupling is relatively large.

Thus, lengthening the known measuring cable while increasing the number of hydrophone groups at the same time is out of the question because, if that were done, the diameter of the conventional coupling constructions would have to be enlarged. Specifically, if the measuring cable is lengthening, a higher tensile strength is necessary because of the increase of longitudinal forces with length, and the limited installation space for the connections of the familiar coupling, there is no space for the additional contacts for more hydrophone groups.

BRIEF DESCRIPTION OF THE INVENTION

A primary object of the invention is to reduce the cable diameters and thus create a lengthened measuring cable which nevertheless saves space, for a larger number of hydrophone groups, and in which the requirements for tensile strength and installation space for the connectors will be satisfied by means of a coupling which is as simple and easy to build as possible.

Briefly described, the invention includes a measuring cable for use in making seismic measurements in an ocean-like environment, the cable having a plurality of hose sections each comprising a hose jacket, a material within the hose jacket tending to contribute to the buoyancy thereof, internal means for supporting the shape of the hose jacket, a plurality of measuring elements within the hose jacket, electrical conductors for interconnecting the elements, and coupling means for interchangeably interconnecting the hose sections, each of the coupling means comprising two substantially identical matable coupler halves each including a sleeve portion connectable to one end of a hose jacket, a cylindrical portion fixedly attached to one end of the sleeve portion and having an axial opening therethrough, and a coupling member extending from the cylindrical portion away from the sleeve portion, said coupling member being curviform in cross section and occupying substantially 180° of arc, said coupling member being shaped to mate with the substantially identical portion on an adjacent hose section so that the joined coupling members define a hollow closed volume, each of the coupling members having longitudinally extending edges with alternating protrusions and recesses; a generally cylindrical tubular coupling jacket surrounding and tightly fitting over the joined coupling members; and connector means within the volume defined by the coupling means for interconnecting electrical conductors extending from within the hose sections to the coupling means.

The invention also contemplates providing a measuring cable of the type described which includes at least one load cable extending longitudinally through each of the hose sections, each load cable having end fittings attached to the coupler halves at opposite ends of a hose section.

Significant advantages of the invention arise from the approximately tubular, cylindrical design of the coupling of the invention having an unobstructed internal space which provides sufficient space for the introduction and accommodation of the required number of lead wires and connections, as well as for fastening of the load cables.

Thus, the diameter of a measuring cable in conformity with the invention can be reduced so much that the same cable winches as previously used can be employed even if the cable lengths are doubled over what was previously used. This is particularly important because only a limited amount of space is available on seismic measurement ships for the cable winch.

The shape of the coupling halves, which are constructed essentially alike, is very simple. Therefore, for a preferred embodiment of the coupling paths as precision castings, only one tool is required which is correspondingly simple and favorably priced and the production of which only requires simple lathe work and scarcely any milling or threading work.

Furthermore, the weight of the coupling is advantageously light because of its tube-like shape.

In order that the manner in which the foregoing and other objects are attained in accordance with the invention can be understood in detail, particularly advantageous embodiments thereof will be described with reference to the accompanying drawings, which form a part of this specification, and wherein:

FIG. 3 is a partial side elevation, in partial section, of a coupling structure in accordance with the invention;

FIG. 4 is a side elevation, in longitudinal section, through the measuring cable portion shown in FIG. 3;

FIGS. 5, 6 and 7 are transverse sections along lines V—V, VI—VI and VII—VII, respectively, of FIG. 4;

FIG. 8 is a side elevation, in longitudinal section, of a different portion of a measuring cable in accordance with the invention showing the installation of measuring elements such as hydrophones;

FIG. 9 is a side elevation, in longitudinal section, of a further embodiment of a measuring cable in accordance with the invention; and FIGS. 10-12 are transverse sections along lines X—X of FIG. 8 and XI—XI and XII—XII of FIG. 9, respectively.

Figure 1:
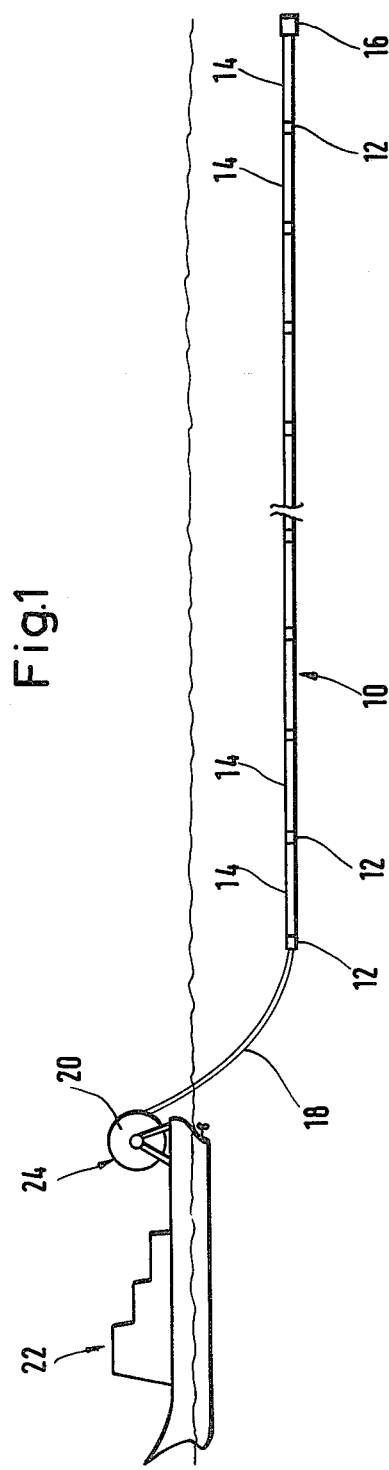
FIG. 1 is a simplified schematic representation of a seismic measuring cable being towed at sea by a measurement ship.

As shown in FIG. 1, a measuring cable of the type which is the subject of the present invention is indicated generally at 10 and is formed from a plurality of individual hose sections arranged in a line and connected in end-to-end relationship, interchangeably, by couplings 12, the hose sections being filled with a buoyancy-imparting material such as oil. At the rear or trailing end of the measuring cable there is a conventional closing member 16. The forward end of the measuring cable is fastened to the cable reel 20 of a cable winch 24 which is located on a measurement ship 22 through a coupling 12 by a flexible towing cable 18.

It was mentioned previously that the difficulties connected with reducing the diameter of a measuring cable, as achieved by the invention, are chiefly associated with the coupling design. Therefore, the basic construction of coupling 12 in conformity with the invention will now be explained with reference first to FIG. 2 which illustrates the coupling with which it is possible to overcome the previously existing difficulties.

Essentially, the coupling 12 comprises two halves 12A and 12B. Both coupling halves have the same shape and they differ only in the nature of the connector parts with which they are respectively fitted. Therefore, the same reference numerals will be used in the following description for identifying the coupling-half parts.

Each coupling half 12A and 12B has a tubular, substantially cylindrical section 30 and a semi-cylindrical or semi-tubular connecting or coupling half 34 which is offset from the cylindrical section by a semi-cylindrical shoulder face 32. It will be observed that the coupling member which extends from the cylindrical portion is curviform in cross section and occupies substantially 180° of arc and, for purposes of simplicity herein, will be referred to as a semi-tube.

The longitudinally extending edges of the semi-tube section extending from shoulder 32 are formed with alternating protrusions 36 and recesses or indentations 38 which are capable of engaging corresponding indentations and protrusions on an identical member when the two members are joined to each other to form a continuous, substantially cylindrical closed housing. When joined, the distal front surface 40 of the semi-tube section of one coupling half abuts half the shoulder 32 of the mating coupling half. Thus, the joined-together coupling halves form a closed, tube-shaped connecting section for the ends of the hose sections 14 of the measuring cable 10 which are to be connected.

As a means of fastening, the coupling of the invention includes a tubular coupling jacket 44 which is pushed over the joined-together coupling halves 12A and 12B and surrounds them in a tight fitting fashion, free of play. The cylindrical portions 30 of the coupling halves are provided with annular grooves 46 which receive gasket rings 48 to engage the inner surface of jacket 44 near the ends thereof to seal the interior space of the couplings securely against the penetration of water. In order to secure the pushed-on jacket 44 against longitudinal movement, the jacket is provided with a hole 50 drilled therethrough near one end to receive a safety screw 54 which extends into and is received by a threaded hole 52 on cylindrical part 30 of the coupling halves.

For connection with the end of a hose section of the measuring cable, the coupling halves 12A and 12B are provided with sleeve attachments 56 which are reduced in diameter compared with cylindrical portion 30 and which taper away from portion 30 to the distal ends thereof. The sleeve portions 56 are roughened with grooves or corrugations 58 over at least a portion of their length for the purpose of improving the engagement between the sleeve 56 and the end of a hose which is pushed onto the sleeve.

In a preferred embodiment, the coupling halves are connected to extension pieces 60 which are preferably made of steel-reinforced plastic like soft PVC or polyurethane and which have the same outer diameter as the cylindrical portion 30 of the coupling. These extensions can be connected tightly with the attachments 56, 58 by cementing, hot-working or by some other attachment technique.

A significant advantage of these extensions consists in the fact that they contribute remarkably to the reduction of the outer diameter of a measuring cable because, with the same outer diameter of the hose sections of the measuring cable and the couplings, they make possible an easy connection of the load cables of a prefabricated hose section with an appropriate coupling half and, at the same time, provide a tight connection of a coupling half with a previously-produced hose section.

Specifically, when manufacturing a measuring cable, the individual hose sections, including the parts which they now contain, must be produced first, and then the coupling halves 12A and 12B are assembled on opposite ends of the hose sections. While this is being done, connector plugs 62 of the lead wires 64 extending to the transducers, and the ends of the load cables 66 are introduced into the respective coupling halves. The load cables 66 are only shown for the coupling half 12A, but it will be understood that corresponding load cable ends are also introduced into the coupling half 12B. The load cables, thus, extend from one end of a hose section to the other and engage the coupling halves provided at both ends thereof.

Cable shoes or end fittings 68 are provided at the end of the load cables in conventional fashion and are coupled to each other by an assembly including a spacer tube 70 which sits between and axially aligned with openings through the cable fittings to maintain the fittings in predetermined spaced relationship. The end fittings themselves are firmly attached to reduced diameter end portions 72 of the spacer tube, the total length of the assembly including portions 70 and 72 being approximately equal to the internal external diameter of the cylindrical portion 30 of the coupling halves. Therefore, the ends of the load cables are secured against lateral movements in the coupling halves to which they belong. The load cable ends are fastened in place by means of bolt 74 which passes through diametrically opposite drilled holes 76 and 78 in portion 30 and a cylindrical hole 79 passing through the spacer tube and so that the bolt, where appropriate, fits firmly in the drilled holes 76 and 78 of the respective coupling halves with a slight interference fit.

For assembling the electrical connectors portions 62A and 62B, there are provided cross bars 80 and 82 which are inserted into the coupling halves through drilled holes 84, 86 and 88, 90, the bars preferably fitting tightly through the holes. The drilled holes 84, 86, 88 and 90 lie in a common plane which is parallel and below the average level of the projections and recesses of the opposite half which is to mater with the connector on which they are mounted. The drilled holes 88 and 90 on portion 12A lie in a recess 38 and, therefore, they are cut from the longitudinal edge of the semi-tube shaped connecting part. Therefore, the crosspieces are flattened on the assembly side in such a way that the fastening surface of the crosspiece 82 in the drilled holes 88 and 90 is aligned with the longitudinal edge in that recess of the connecting part.

The plug parts 62A and 62B are fastened by means of bolts or machine screws which pass through holes drilled in the mounting flanges 92A and 92B of the plug parts and are screwed into threaded holes in the crosspieces 80 and 82. In the embodiment shown, for example, three parallel plug assemblies can be accommodated in the hollow volume defined and enclosed by the joined-together connecting parts 34 of the coupling halves 12A and 12B.

The tightening jacket 44, which was previously pushed onto the attached hose on one coupling half before the coupling halves were joined together, is then pushed over the coupling after the two coupling halves 12A and 12B are joined together and is then secured in place by means of the safety screw 54.

FIGS. 3 and 4, respectively, show a partially cutaway side view and a longitudinal section of a portion of a completed measuring cable in conformity with the invention, with a coupling 12 assemblied, essentially, from halves 12A and 12B and a coupling jacket 44 as well as the end, attached to it, of one of the hose sections 14 of the measuring cable connected by the coupling.

In addition to some components which are somewhat modified as compared with FIG. 2, other details of the measuring cable of the invention are explained in the following. The reference symbols from FIG. 2 are again used for the identical or only very slightly modified components. The coupling half 12A, lengthened with a steel-reinforced plastic piece of hose 60 and the connectoed, oil-filled hose section 14 of the measuring cable 10, are joined together by means of a connecting or terminating piece 100 which is fastened with a conventional hose clip 102 at the end of hose section 14, this being accomplished during the preliminary assembly process, so that piece 100 constitutes the termination of the hose section. The steel reinforcements of the extension 60 are identified at 104. When the coupling half 12A is attached (see in particular FIG. 4), the plug connections 62A located at the end of the electrical conductors 64 which are combined into a multistrand cable, and the cable shoes located at the ends of the load cables 66 are introduced into the coupling half 12A through the extension 60 and the free end of the connecting piece 100 constituting the termination of the hose section 14 which is inserted into the end of extension 60.

As shown in FIG. 4, the crossbars 80 and 82 for fastening the plug connections 82, in this embodiment, are replaced by bridge-like assembly crosspieces 180 and 182 integrally formed in one piece with the semi-tube connecting portion 34 of the coupling half.

Figure 2:
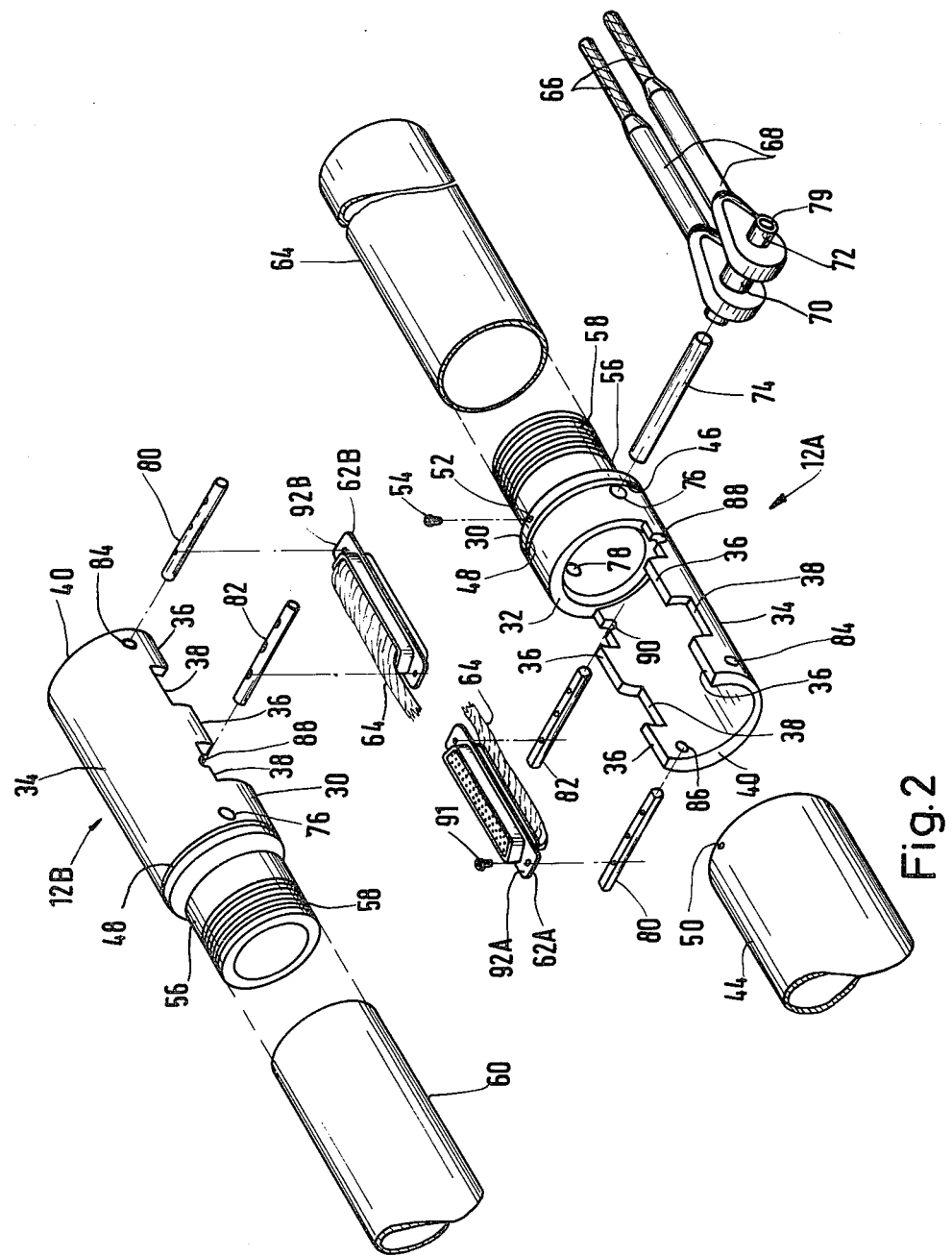
FIG. 2 is a perspective exploded view of the essential parts of a coupling in accordance with the invention for interconnecting individual measuring cable sections.

In this embodiment, the lateral attachments 72 of the spacer tube connecting the cable end fittings 68 provided in accordance with FIG. 2, are also missing. Instead, the cylindrical section 30 of the coupling halves is made with an interior cross section in the shape of an O flattened at the sides as shown in the cross section of the measuring cable in FIG. 6. Thus, this axial opening is provided with parallel spaced apart planar faces and the outer surfaces of the cable end fittings lie adjacent these parallel surfaces 106 and 108 of the interior opening, the inner surfaces of the cable end fittings abutting the ends of a spacer 70. Thus, the fittings are secured against transverse displacement.

This feature also results in a desirable strengthening of the wall parts of the cylindrical section 30 of the coupling halves which are put under heavy strain in transferring the longitudinal forces. This strengthening of the wall also makes possible a somewhat different placement and construction of the bolt which retains the fastening shoes. Instead of the drilled holes 76 and 78 described in connection with FIG. 2, there is provided a drilled hose 176 which extends inwardly only on one side of portion 30, the drilled hole opposite hole 176 being formed as a blind drilled and tapped hole 178.

This embodiment also leads to a further-improved sealing against penetration by the surrounding water, the set bolt 174 being provided with an annular groove in that portion of the bolt which lies within hole 176 to receive a gasket ring 110 which seals the plug chamber. An axial threaded drilled hole 112 on the top of the set bolt 174 is used to remove the set bolt by means of a screwing tool. After the plug connections are assembled and the load cables are fastened, the end of the extension 60 which is fastened to the end of the termination piece 100 is pressed tightly against the connecting portion thereof with a hose clip 114.

Another portion of the apparatus which is modified, by comparison with the embodiment of FIG. 2, consists in providing a cylindrical pin 154 with a threaded drilled hole 116 for removing the pin, this instead of a safety screw 54.

The terminating piece 100, which constitutes the termination of the hose section 14, can be perceived best from FIGS. 4 and 7. This connecting piece preferably consists of two halves 118 and 120, joined together, whose abutting, axially extending contact surfaces have semi-circular longitudinal grooves which, when the two halves are joined together, form axially extending openings for the load cables 66 to pass through, which cables preferably fit into the grooves in oil-tight relationship. In the upper half 120 of the connecting piece is provided a filling and ventilating opening 122 which extends from the outer surface of the termination piece to the inside of hose 14 through the end of the termination piece which extends into the hose. Opening 122 receives a valve 124 and a plug 125 which fits in fluid-tight relationship.

In the lower half 118, there is provided an opening 126 for the electrical connecting cable 64 to pass through and into which the connecting cables are introduced before the plug connections 62A and 62B are attached to the wires. The opening is then filled with a packing material 128 surrounding the cable strand 64 in oiltight relationship in such a way that the opening of the filling and ventilating well 122 remains free of obstruction. In order to ensure a tight connection by means of the hose clip 102 in every case, the external surface of the terminating piece 100 is roughened with several annular grooves 130 or the like at the hose end into which the flexible material of the hose 14 is pressed by means of the hose clip 102. Corresponding annular grooves 132 are also provided at the other end of the terminating piece 100 in order to connect it with extension 60, in oiltight and watertight relationship, with the hose clamp connection. This end has a reduced diameter portion defined by a shoulder or step 134, the step 134 forming a stop shoulder which ensures the same depth of insertion in every case.

On the other side, it is possible, because of the two-part construction of the connecting part, to locate it on the load cables without difficulty in such a way that its free end with the cable shoes 68 always has the same length for fastening to the coupling.

The cross section through the coupling of the invention shown in FIG. 5 demonstrates still another important feature of the invention. In accordance with this feature, the inner surfaces of the semi-tube connecting parts 134 of the coupling halves are offset or displaced relative to the outer surfaces by a displacement of the center of curvature. Thus, a smaller wall thickness exists at the base of the semi-tube connecting parts and the wall thickness increases continually toward the longitudinal edges and is greatest in the area of the coupling protrusions 136. This displacement of the center curvature is desirable from the point of view of production technology in that it makes simple processing work possible. Along with additional savings of materials and weight, another significant advantage of this development of the coupling halves of the invention lies in the fact that the connection parts are strongest where the greatest strain appears from the longitudinal forces.

The partial sections of the measuring cable of the invention, shown in FIGS. 8 and 9, both show a hose section 14 of a measuring cable connected to the extension 60 strengthened with circular steel inserts 104, and they illustrate various possibilities for letting the electrical wires and locating the hydrophones in the measuring cable.

In the embodiment shown in FIG. 8, the hose jacket 14 is supported by molded body 140 at definite predetermined intervals. Like the connecting pieces 100, the molded bodies 140 each consist of two prefabricated plastic molded pieces 142 and 144 with two openings 146 and 148 for the lead strand 64 to pass through which, in this example, is divided into two branches 642 and 644. Anchoring pieces 150 consisting of clamping sleeves, for example, are previously put on the load cables 66 at the desired intervals. The joined-together parts 142 and 144 of the molded body 140 enclose a hollow space formed by recesses in the abutting surfaces which correspond to the anchoring pieces 150 in shape and size. The molded bodies joined together on the anchoring pieces 150 are thereby retained against longitudinal movement with respect to the load cables 66 by the anchoring pieces. Furthermore, semicircular longitudinal grooves which are exactly opposite each other are hollowed out in the contact surfaces. When the molded bodies are joined together, these grooves form the openings for load cables 66 to pass through.

The hydrophones 152 located at spaced intervals in the measuring cable are each located between two molded bodies 140 in this embodiment. Hydrophone 152 which, as shown, is shaped cylindrically (see also the cross section in FIG. 10) which electrical connections 154 and 156, for example, lead to the cable strand 642, are located in a holding device 158 clamped firmly to the load cables 66. This holding device is comprised, simply, of two flexibly pliable halves 160 and 162 made of a polymeric material whose end sections, each partially enclosing the load cable, are held together by spring clips 166. The middle part of the joined-together holding device encloses a cylindrical hollow space for receiving a hydrophone 152 held therein flexibly.

In the embodiment of the measuring cable of the invention shown in FIG. 9, the supporting molded bodies, which again consists of two parts joined together on anchoring pieces in the load cable 66, are somewhat modified from the embodiment shown in FIG. 8. In that connection, two types of molded bodies, which are designated 190 and 192, and which differ somewhat in their structure, are illustrated.

The shape of the lower part 162 of both molded bodies 190 and 192 is identical. As in the embodiment in FIG. 8, the parts 194 have an opening for the lead strand 64 to pass through, and longitudinal grooves for receiving the load cables 66, as in the upper part 196.

However, the upper parts 196 and 198 which are shown at the top of the drawing differ somewhat from the lower parts and from each other in their shape. Specifically, the parts 196 only have longitudinal grooves provided for receiving the load cables in the surface which is in contact with the lower part as seen in FIG. 12, while another opening 200 is provided in the parts 198 for the installation of an essentially disc-shaped hydrophone 202 as seen also in FIG. 11. The cross-sectional shape of the recess 200 is such as to conform to the shape of the hydrophone housing, which is held securely in the recess 200 because of the elasticity of the polymeric material used to make the molded bodies. The hydrophone lines leading to the cable strand 64 are identified as 204 and 206 in FIG. 11.

The right-hand end of the hose section 14, not shown in FIGS. 8 and 9, is closed off with a connecting piece 100 in the same way as the left end which is shown in the drawings. In order to fill a hose section 14 with the oil used as a means of providing buoyancy, the plugs 125 outside the valves 124 are removed from the filling and ventilating openings 122. The oil is then poured through an opening 122 and valve 124, which is opened by the inflation pressure when appropriate at the one end, and the oil extends through the hose and through the opening for the supporting molded bodies to pass through and on past their outer surfaces. While this is being done, the valve 124 at the other end serves for the purpose of venting, to permit the escape of air therein. When the desired amount of oil has been put in, the plugs 125 are replaced. In that connection, it should be noted that a reliable sealing is especially assured when the valve 124 carries a gasket ring 210 located in an annular groove 208.

From this description, it will be observed that the measuring cable of the invention reliably fulfills all of the demands made from it in operation. A wall thickness in the coupling portions is obtained which increases from the bottom of each semi-tube depression to the protrusions at the longitudinal edges by altering the midpoints of the inner and outer radii of the semi-tube connecting parts. From this, there results, in addition to weight reduction, the advantage that the toothed or castellated protrusions in the joined-together couplings which are most severely burdened by the longitudinal forces are also the most strongly constructed.

In the especially preferred embodiment of the invention for the oil streamers, with oil as a means of buoyancy, the cylindrical section of the coupling half has an extension which connects the coupling with the end of an oil-filled hose section of the cable, and this is done through a connecting or closing piece provided with sealed-off passages for load cables and lead wires which closes off the ends of the hose section tightly. With the considerably reduced cable diameters of the invention, this advantageous arrangement makes possible a simple, reliable and tight connection of the completely prefabricated hose sections with the coupling halves that go with them.

Preferably, the extension consists of steel-reinforced plastic, such as polymeric material, and it is connected firmly, as by cementing, with the coupling half that accompanies it. The light weight of this extension also has a favorable effect on the total weight of the coupling and, consequently, of the measuring cable.

The extension is sufficiently pliable so as not to hinder coiling up the measuring cable. At the same time, however, the extension is sufficiently resistant to compression and inherently stable against static water pressure when the cable is used.

For the sake of simplicity in mounting the connecting pieces between the coupling and the measuring cable sections in the proper position, the connecting pieces in the preferred embodiment of the invention consist of two molded plastic parts which are fitted together on the load cables. Subsequently, passage for the electric lead wires filled with a packing material, as well as filling or ventilation openings between the outer jacket and one end of the connecting pieces are kept open by appropriately shaped inserts in the manufacturing of the molded parts.

Preferably, anchoring pieces consisting of clamping sleeves can be fastened on the load cables which engage in opposing recesses in the contact surfaces of the parts when the two parts of the connecting piece are put together.

In the same way, the molded pieces supporting the hose casing of the measured cable can consist, preferably, of two parts placed together on the load cables. These molded pieces, also, are made with openings through them for the electrical conductors. The connecting pieces and the supporting molded pieces can also be made in one piece and molded directly to the load cables for the anchoring pieces on the load cables. The connecting pieces and the supporting molded pieces can consist of foamed plastic having a density less than that of the oil used as a buoyancy means. Thus, they also contribute to the light weight and support of the measuring cable.

Even if the measuring cable lengths used up to the present time, of 2,400 meters, are doubled, and the number of hydrophone groups is doubled, to 192, the cable diameter can be made so small that the winding volume of the coiled-up cable of the former 2,400 meters cable is not exceeded. Thus, the former cable winches can be retained and no additional space is required on the measurement ships.

These considerable advantages can be achieved with commercially available plug connections, such as microminiature plug connections, for example. These connectors, for example, have a contact thickness of one-third contact per square millimeter, which is sufficient for reliable operation at sea. With 192 hydrophone groups, a total of approximately 450 contacts, including contacts required for auxiliary functions, are required, resulting in a clear contact surface with approximately 1,600 square millimeters, for an area of 25×60 millimeters, for example. Because of the mechanical fitting and control processes, an installation surface of approximately 30×80 millimeters will therefore be required. That surface is available in a coupling with an exterior diameter of approximately 47 millimeters, whereas the 2,400 meter measuring cables of a known type have an exterior diameter of approximately 66 millimeters. This reduction of the diameter that is obtainable with the invention results in a halving of the previous measuring cable cross sections.

At the same time, the coupling of the invention necessarily has a tensile strength amounting to approximately 6,000 kp, with a cable length of 4,800 meters, and all the more so since the measuring cable of the invention, including the coupling, is built through advantageous design and selection of materials to have the advantage of saving weight. Plastics usable for the molded bodies as termination pieces 100 and support pieces 140, 190, etc., are materials like polypropylene, polyamide or polyutethane eventually additionally glass reinforced and/or foamed.

While certain advantageous embodiments have been chosen to illustrate the invention, it will be understood by those skilled in the art that various changes and modifications can be made therein without departing from the scope of the invention as defined in the appended claims.

What is claimed is:

1. A measuring cable for use in making seismic measurements in an ocean-like environment, the cable having a plurality of hose sections each comprising a hose jacket, a material within the hose jacket tending to contribute to the buoyancy thereof, internal means for supporting the shape of the hose jacket, a plurality of measuring elements within the hose jacket, electrical conductors for interconnecting the elements, and coupling means for interchangeably interconnecting the hose sections, each of said coupling means comprising two substantially identical matable coupler halves each including
a sleeve portion connectable to one end of a hose jacket,
a tubular, substantially cylindrical portion fixedly attached to one end of said sleeve portion and having an axial opening, and
a semi-tubular coupling member extending from said cylindrical portion away from said sleeve portion, said coupling member being curviform in cross section and occupying substantially 180° of arc,
said coupling member being shaped to mate with the substantially identical portion on an adjacent hose section so that the joined coupling members define a hollow, substantially cylindrical, closed volume,
each of said coupling members having longitudinally extending edges with a plurality of alternating protrusions and recesses, said protrusions and recesses being rectangular in shape and overlapping a plane passing through the central axis of the joined halves and the mean connection lines between the joined halves;
a generally cylindrical tubular coupling jacket surrounding and tightly fitting over the joined coupling members;
connector means within the volume defined by said coupling means for interconnecting electrical conductors extending from within the hose sections to said coupling means;
at least one load cable extending longitudinally through each of said hose sections, such said load cable having end fittings attached to the coupler halves at opposite ends of the hose section;
each of said hose sections being provided with a coupler half at opposite ends thereof, said semi-tubular coupler members being open in substantially opposite radial directions.

2. A measuring cable according to claim 1 wherein said cylindrical portion includes
an annular gasket and
means in the outer surface of said portion to receive said gasket within and in contact with an inner surface of said coupling jacket to form a fluidtight seal therebetween.

3. A measuring cable according to claim 1 and further comprising
sealing means in said sleeve portion, said sealing means having axially extending openings for passage of said electrical conductors and said load cable.

4. A measuring cable according to claim 1 wherein each of said coupling members is formed in one piece.

5. A cable according to claim 1 and further including cross bars extending through said volume for supporting said connector means.

6. A cable according to claim 5 wherein said cross bars are integrally molded to said coupling halves.

7. A cable according to claim 1 and including two load cables having end fittings with holes therethrough, and means for attaching two of said end fittings to one of said coupling members including
a spacer tube lying between said holes; and
a rod extending through said holes and said spacer tube and into said cylindrical portion of said one of said coupler halves.

8. A cable according to claim 7 wherein said rod is threaded and is received in a threaded hole in said cylindrical portion.

9. A cable according to claim 7 wherein said rods lie in a plane substantially parallel with the plane containing a mean of the protrusions and recesses in said edges.

10. A cable according to claim 7 wherein the central opening in said cylindrical portion has parallel oppositely facing planar walls, and said end fittings have generaly flat surfaces abutting said walls.

11. A cable according to claim 1 wherein said sleeve portion of each of said coupler halves has a smaller outer diameter than said cylindrical portion, said coupler halves further comprising
a tubular extension member joined at one end to said sleeve portion and
means at the other end of said extension member for joining said end to a hose jacket.

12. A cable according to claim 11 wherein said extension member comprises a steel-reinforced section of plastic hose which is pliable and resistant to the crushing force of external hydraulic pressure.

13. A cable according to claim 11 wherein said means for joining the end of said extension member to the hose jacket end includes
a termination piece having an end portion thereof inserted in fluidtight relationship into the hose jacket end,
said termination piece having axially extending openings for fluidtight passage of said at least one load cable and for said electrical conductors;

packing material surrounding said conductors within said termination piece;

means defining a filling and ventilating channel in said termination piece extending from an exterior surface thereof to the end portion thereof inserted into said hose jacket; and means for closing and sealing said channel.

14. A cable according to claim 13 wherein the other end of said termination piece is tightly inserted into and fastened to an end of said extension member.

15. A cable according to claim 14 wherein said termination piece includes first and second separately formed portions joined to said at least one load cable at a point spaced from the end fittings, said separating formed portions having grooves in the contact surfaces thereof to form said axially extending openings for the load cables.

16. A cable according to claim 1 wherein said internal means for supporting the shape of the hose jacket each includes first and second mating molded bodies which, when joined, form a cylindrical support body having axial openings for said electrical conductors and axial grooves in abutting surfaces thereof to define, when joined, axial openings for said at least one load cable.

17. A cable according to claim 16 wherein said molded bodies are formed from a polymeric material.

18. A cable according to claim 16 and further comprising anchoring members received in said axial grooves in said molded bodies for engaging said at least one load cable and preventing longitudinal movement of said molded bodies relative to said load cable.

19. A cable according to claim 16 wherein selected ones of said molded bodies include means defining a recess for receiving a measuring element such as a hydrophone.

20. A cable according to claim 1 wherein said internal means for supporting the shape of the hose jacket includes a plurality of axially spaced molded members, each of said members being formed in one piece on said at least one load cable.

21. A cable according to claim 20 wherein selected ones of said molded bodies include means defining a recess for receiving a measuring element such as a hydrophone.

22. A cable according to claim 1 and including means for attaching said measuring elements to said at least one load cable at axially spaced points along the cable.

23. A cable according to claim 22 wherein each of said means for attaching includes first and second bodies formed from a flexible polymeric material and shaped to engage said load cable, and clamp means for holding said bodies on said cable.

24. A cable according to claim 1 wherein said material tending to contribute to buoyancy is oil.

25. A cable according to claim 1 wherein said material tending to contribute the buoyance is a foamable polymeric material.

26. A measuring cable according to claim 1 wherein the axial lengths of said protrusions and recesses are substantially equal to each other.

27. A measuring cable for use in making seismic measurements in an ocean-like environment, the cable having a plurality of hose sections each comprising a hose jacket, a material within the hose jacket tending to contribute to the buoyancy thereof, internal means for supporting the shape of the hose jacket, a plurality of measuring elements within the hose jacket, electrical conductors for interconnecting the elements, and coupling means for interchangeably interconnecting the hose sections, each of said coupling means comprising two substantially identical matable coupler halves each including
a sleeve portion connectable to one end of a hose jacket,
a cylindrical portion fixedly attached to one end of said sleeve portion and having an axial opening, and
a coupling member extending from said cylindrical portion away from said sleeve portion, said coupling member being curviform in cross section and occupying substantially 180° of arc,
said coupling member being shaped to mate with the substantially identical portion on an adjacent hose section so that the joined coupling members define a hollow, closed, substantially cylindrical volume,
each of said coupling members having longitudinally extending edges with alternating protrusions and recesses;

a generally cylindrical tubular coupling jacket surrounding and tightly fitting over the joined coupling members;

connector means within the volume defined by said coupling means for interconnecting electrical conductors extending from within the hose sections to said coupling means; and at least one load cable extending longitudinally through each of said hose sections, said load cable having end fittings attached to the coupler halves at opposite ends of the hose section, and wherein each of said coupling members is formed as a half-tube and wherein the midpoint of the internal radius of each half-tube is offset outwardly with respect to the midpoint of the external radius in such a way that the wall thickness thereof is greatest in the area of the protrusions on said longitudinally extending edges.

* * * * *